Aug. 24, 1943.  K. L. STONE ET AL  2,327,612
METHOD OF AND APPARATUS FOR GENERATING PICTURES
OF THE FUNDUS OF THE LIVING EYE
Filed Oct. 30, 1940
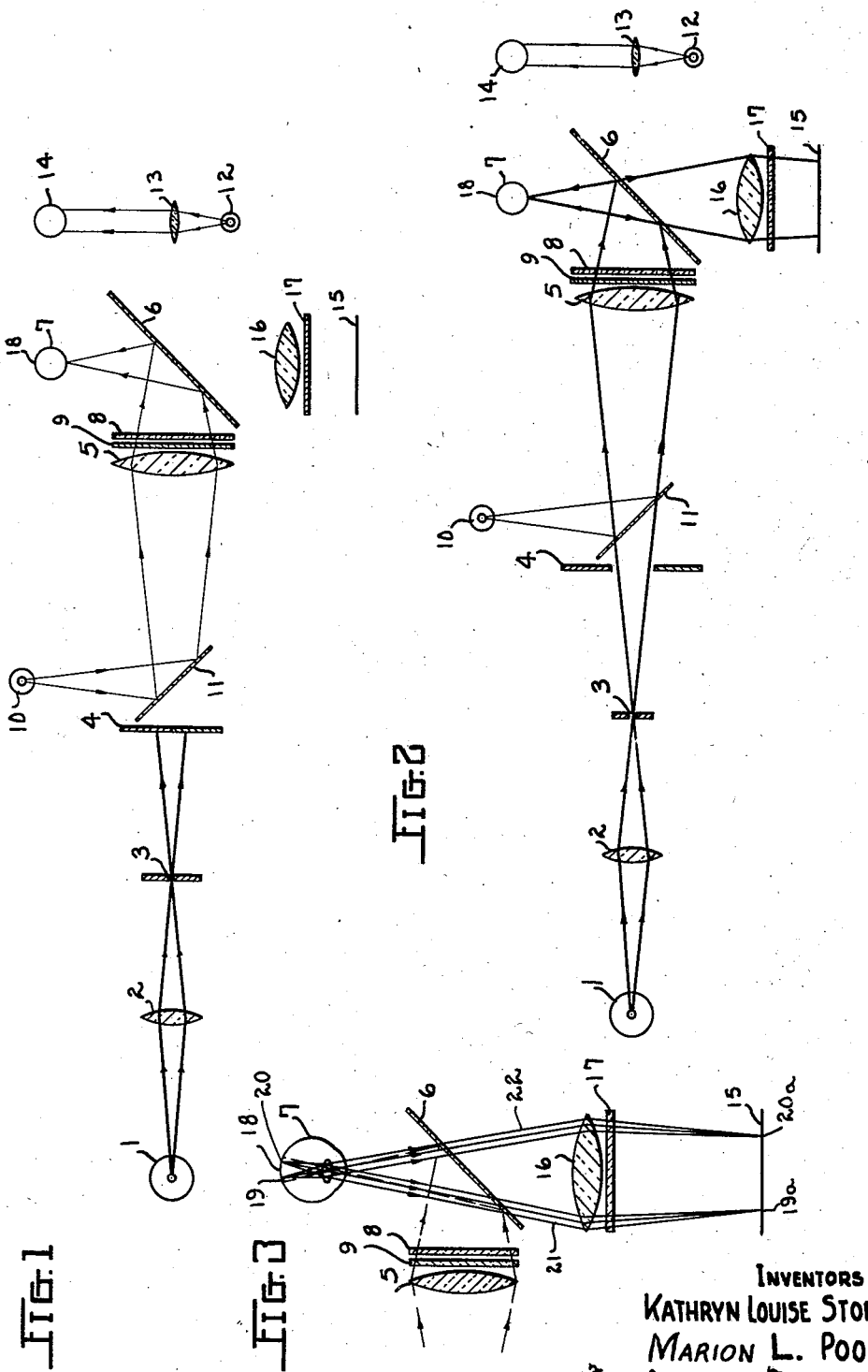
INVENTORS
KATHRYN LOUISE STONE
MARION L. POOL
BY
ATTORNEYS Patented Aug. 24, 1943

2,327,612

UNITED STATES PATENT OFFICE 2,327,612

METHOD OF AND APPARATUS FOR GENERATING PICTURES OF THE FUNDUS OF THE LIVING EYE

Kathryn Louise Stone, Vincennes, Ind., and Marion L. Pool, Columbus, Ohio, assignors to The Ohio State University Research Foundation, Columbus, Ohio, a corporation of Ohio Application October 30, 1940, Serial No. 363,528

7 Claims. (Cl. 88—20)

This invention relates to eye photography and in particular to fundus photography.

Photographs of the back or fundus of the living eye have been successfully made in the past and have been of utmost value in the diagnosis and prognostic observation of many affections of the eye. However, when photographing the living fundus, it was necessary, prior to the present invention, to instill a drug, a so-called cycloplegic, into the eye under observation to dilate the pupil and to prevent it from contraction under the high illumination levels required for the satisfactory operation of the retinal cameras heretofore available for fundus photography.

Aside from the rather inconvenient corneal reflex caused by the instillation of a cycloplegic into an eye, the known method of photographing the fundus of the living eye, has the further disadvantage of being limited in its use to relatively few persons who are permitted to use drugs, such as cycloplegics.

Accordingly, it is an object of the invention to provide a new method of photographing the fundus of the living eye which will avoid the customary corneal reflex.

It is another object of the invention to provide a method which will make fundus photography possible without the instillation of a cycloplegic into the eye to be examined.

Another object of the invention consists in the provision of a method of fundus photography which makes it possible to create an increased illumination of the fundus without artificially dilating the pupil of the eye.

It is a further object to provide a relatively inexpensive device which will simplify the taking of pictures of the fundus of the living eye.

It is still another object to provide a relatively simple optical arrangement which in connection with a camera will improve fundus photography.

A further object of the invention consists in the provision of an optical system for improving the illumination of the fundus of the living eye.

A still further object of the invention consists in the provision of an optical system which in connection with a camera will enable the taking of pictures of the fundus of the living eye with a minimum of light and without artificial dilation of the pupil of the eye to be examined.

These and other objects and advantages of the invention will appear more clearly from the following specification in connection with the accompanying drawing, in which:

Figure 1 is a schematic diagram of the optical arrangement according to the invention, showing the system before taking a picture of the fundus.

Figure 2 is a diagram similar to that of Figure 1, but showing the arrangement while a picture is being taken.

Figure 3 shows on a somewhat larger scale the optical system involved in the emission of light for the illuminated fundus.

General arrangement

The present invention makes use of the fact that the light reflected from the cornea remains for the most part polarized, while the light reflected from the fundus is depolarized. Since the intensity of the light reflected from the cornea is comparable to that of the fundus, according to the invention all light polarized in the original plane is cut out so that only depolarized radiation from the fundus gets through to the photographic film. The cutting out of the undesired polarized light is preferably effected by means of polarizing agents in cooperation with an optical system.

Furthermore, the camera for taking the fundus picture is set at a dim light, while the actual picture is taken at a strong light which flashes up only for such a short time that the pupil of the eye has no time to contract while the picture is taken.

Arrangement of optical setup

Referring to the drawing, 1 designates a primary light source of high intensity in front of which is arranged a convex lens 2 for passing the light emanated from the light source 1 onto a variable slit 3. In front of the slit 3 is arranged a shutter 4 through which the light, when the shutter is open, may pass to a second convex lens 5.

This second lens 5 is so arranged as to focus the light with the assistance of a mirror 6 at the pupil of the eye 7 to be examined. The light emanated from the light source 1 is used to illuminate the fundus. A first polarizing agent 8 and a special light filter 9 are placed between the second convex lens 5 and the eye 7.

A second light source 10 is arranged so that also with the aid of a mirror 11 the image produced by the second convex lens 5 is also at the pupil of the eye under observation. The mirrors 6 and 11 are preferably plain and merely transparent mirrors made of thin pieces of good quality glass. This second light source 10 which is weak and can be varied to just visibility is used merely as a very weak ocular fixation object by the patient prior to bringing into focus the primary light source 1.

A third light source 12 substantially equal to the second minor fixation light source 10 is placed at the primary focus of a convex lens 13 and is provided to enable the eye 14 not under observation to view the virtual image of the fixation lamp 12.

15 designates the photographic plate or film in the camera for taking the fundus picture. Associated with the camera is a convex lens 16, while a second polarizing agent 17 is placed immediately behind the lens 16.

The first polarizing agent, preferably a Polaroid lens, is rotated in such a way that the light from the slit 3 is polarized in a perpendicular plane, while the second polarizing agent 17, preferably a Polaroid lens, is arranged in such a way as to cut out all light polarized in the original plane. By using this technique, only depolarized radiation from the fundus gets through the second polarizing agent 17 and onto the photographic film 15.

Operation

In carrying out the non-cycloplegic type of photography according to the present invention, the patient as well as the complete setup should be housed in a dark booth or room from which nearly all light can be excluded. To take a picture of the fundus, the shutter 4 is first closed whereupon the weak light sources 10 and 12 are turned on and varied to just visibility. The eyes 7 and 14 now see a faint general red glow when the adjustments are correct.

As previously mentioned, the light source 12 is merely for enabling the eye not under observation to relax, while both the weak light sources 10 and 12 make it possible for the patient to put his eye to be photographed in the proper position and to get accustomed to the darkness in the room. If the light from the strong light source 1, which may be about ten thousand times as strong as the light source 10, were admitted through the shutter 4 for the purpose of making preliminary adjustments, the iris of the patient would contract to such an extent that subsequent photography would be impossible.

Since the amount of light from the light sources 10 and 12 is just sufficient to give to the patient the sensation of light, the amount of light reflected back from his illuminated fundus and onto the photographic film is so weak that it is not necessary to use a shutter on the camera lens itself.

Since now both eyes 7 and 14 are in relaxed position, it is only necessary to set the camera unit to focus parallel light in order to get a sharp picture of the fundus of the eye 7 to be under observation. When these preliminary adjustments have been made, the shutter 4 is opened for a predetermined very short length of time, for instance one-tenth of a second, to allow the light from the very strong primary source 1 to illuminate the fundus.

The light emanating from the source 1 is then condensed by the lens 2 onto the variable slit 3 from where it passes through the shutter 4 into the lens 5. From the lens 5 the light passes through the light filter 9 and the polarizing agent 8 onto the mirror 6 and is focused in the pupil of the eye 7. The light passes on into the eye and merely illuminates the fundus. The emission of light from the illuminated fundus 18 is then effected, as illustrated in Figure 3. As will be seen therefrom, the light leaving the points 19 and 20 which are both in the primary focal plane in the compound lens system of the eyes is defined by the iris and consists of two diverging beams of parallel light. A portion of the camera lens 16 intercepts these two beams and focuses them on the photographic plate 15 at the points 19a and 20a respectively. In this way a known cycloplegic fundus picture is made. As experience has proved, fundus pictures made according to the present invention compare very favorably with the best fundus pictures taken heretofore according to the cycloplegic method of fundus photography.

It has been found that it is highly advantageous to use a camera lens 16 which has a large aperture, in order to receive light from widely separated portions of the fundus and a focal length as short as possible so as to reduce the size of the image and thus increase the speed of the camera.

Good results have been obtained with focal length of the lenses 2 and 5 of 35 mm. and 60 mm. respectively. For the lens 16, focal lengths 75, 50 and 25 mm. with speeds respectively f: 1.8, f: 1.5, f: 1.3, have yielded highly satisfactory results. Although various types of lamps may be used for the primary light source 1, a 1000-watt water-cooled mercury arc lamp with high intrinsic intensity and a narrow capillary source and the spectral energy distribution is particularly suited for the method according to the invention.

The contrast on the photographic film between the blood vessels and the surrounding medium that composes the fundus of the eye is brought out best with green light illumination. It is, therefore, advantageous to use a lamp which emits a large percent of its total radiation in the yellow-green light 5461 A. U. A lamp which meets the above features is sold by the General Electric Company under the commercial name H–6000-watt water-cooled mercury arc lamp, although other lamps may be used in connection with the present invention. In comparison with other types of mercury arcs, there is from this new lamp a very pronounced continuous spectral background. The energy in this background is small compared with the energy in the principal mercury lines. The principal lines 4358 A. U., 4047 A. U., and 3660 A. U., should not be allowed to enter the eye and may be removed by corresponding filters.

It will be understood that we desire to comprehend within our invention such modifications as come within the scope of the claims and the invention.

Having thus fully described our invention, what we claim as new and desire to secure by Letters Patent is:

1. In a system for recording a picture of the fundus of the living eye, comprising a first light source of high intensity, optical means associated with said first light source and adapted to transmit light emitted from said first light source to the eye to be tested, a second light source constituting a minor fixation light for faintly illuminating the eye to be tested to keep the contraction of the iris at a minimum, picture recording means adapted to receive light reflected from said eye to thereby record a picture of the fundus of said eye, a third light source substantially equal in intensity to said second light source and adapted to illuminate the eye not under observation, means interposed between said first light source and the eye to be tested for polarizing the light emitted from said first light source, and means interposed between the eye to be tested and said picture recording means for substantially preventing polarized light reflected by said eye from reaching said picture recording means.

2. A method of generating a picture of the fundus of the living eye which includes illuminating both eyes faintly to keep the contraction of the iris at a minimum without the employment of a cycloplegic, focusing of camera means for receiving light beams emitted from the fundus, intensively illuminating the eye under observation by polarized light for a fraction of a second, cutting out substantially all polarized light reflected in the original plane in which it was sent into the eye, and directing the light from the fundus to the camera means.

3. A method of generating a picture of the fundus of the living eye which includes illuminating both eyes faintly to keep the contraction of the iris at a minimum without the employment of a cycloplegic, focusing of camera means for receiving light beams emitted from the fundus, intensively illuminating the eye under observation by polarizing green light rays and projecting said light rays into said eye for a fraction of a second, cutting out substantially all polarized light reflected in the original plane in which it was sent into the eye, and directing the light from the fundus to the camera means.

4. A method of generating a picture of the fundus of the living eye which includes illuminating both eyes faintly to keep the contraction of the iris at a minimum without the employment of a cycloplegic, focusing a camera means for receiving light beams emitted from the fundus, intensively illuminating the eye under observation by polarized light for a time less than required by the iris to contract in reaction to said polarized light, cutting out substantially all polarized light reflected in the original plane in which it was sent into the eye, and directing the light from the fundus to the camera means.

5. In a system for generating a picture of the living eye which includes means for illuminating both eyes faintly to keep the contraction of the iris at a minimum without the employment of a cycloplegic, camera means for receiving light beams emitted from the fundus, means for intensively illuminating by polarized light rays the eye under observation for a fraction of a second, means for cutting out substantially all polarized light reflected in the original plane in which it was sent into the eye, and means for directing the light reflected by the fundus to the camera means.

6. In a system for generating a picture of the living eye which includes means for illuminating both eyes faintly to keep the contraction of the iris at a minimum without the employment of a cycloplegic, camera means for receiving light beams emitted from the fundus, means for intensively illuminating by polarized green light rays the eye under observation for a fraction of a second, means for cutting out substantially all polarized light reflected in the original plane in which it was sent into the eye, and means for directing the light reflected by the fundus to the camera means.

7. In a system for generating a picture of the living eye which includes means for illuminating both eyes faintly to keep the contraction of the iris at a minimum without the employment of a cycloplegic, camera means for receiving light beams emitted from the fundus, means for intensively illuminating the eye under observation by polarized light for a time less than required by the iris to contract in reaction to said polarized light, means for cutting out substantially all poralized light reflected in the original plane in which it was sent into the eye, and means for directing the light from the fundus to the camera means.

KATHRYN LOUISE STONE.
MARION L. POOL.